United States Patent
Wieczorek et al.

(10) Patent No.: US 12,296,286 B2
(45) Date of Patent: May 13, 2025

(54) WATER RETENTION BARRIER

(71) Applicant: CUMMINS FILTRATION IP, INC., Columbus, IN (US)

(72) Inventors: Mark T. Wieczorek, Cookeville, TN (US); Joshua Ryan Hendrixson, Smithville, TN (US); Gregory D. Shope, Cookeville, TN (US); Brian M. Palmer, Cookeville, TN (US)

(73) Assignee: CUMMINS FILTRATION IP, INC., Columbus, IN (US)

( * ) Notice: Subject to any disclaimer, the term of this patent is extended or adjusted under 35 U.S.C. 154(b) by 0 days.

(21) Appl. No.: 18/120,006

(22) Filed: Mar. 10, 2023

(65) Prior Publication Data

US 2023/0219018 A1 Jul. 13, 2023

Related U.S. Application Data

(62) Division of application No. 16/629,693, filed as application No. PCT/US2018/045344 on Aug. 6, 2018, now Pat. No. 11,612,834.

(Continued)

(51) Int. Cl.
*B01D 17/04* (2006.01)
*B01D 36/00* (2006.01)
*F02M 37/24* (2019.01)

(52) U.S. Cl.
CPC ......... *B01D 17/045* (2013.01); *B01D 36/003* (2013.01); *F02M 37/24* (2019.01); *B01D 2201/291* (2013.01)

(58) Field of Classification Search
CPC ............... B01D 17/045; B01D 36/003; B01D 2201/291; B01D 29/21; B01D 29/58; B01D 36/005; F02M 37/24
See application file for complete search history.

(56) References Cited

U.S. PATENT DOCUMENTS 4,502,955 A    3/1985  Schaupp
4,619,764 A *  10/1986 Church ............... B01D 17/045
                                                         210/248

(Continued)

FOREIGN PATENT DOCUMENTS

CN      105492097          4/2016
DE      102012109761 A1 *  5/2013  ............. B01D 29/21
JP      H07102303 B2 *    11/1995

OTHER PUBLICATIONS

First Office Action issued for Chinese Patent Application No. 201880050056.4, issued May 12, 2021, 12 pages.

(Continued)

*Primary Examiner* — Liam Royce
(74) *Attorney, Agent, or Firm* — Benesch Friedlander Coplan & Aronoff LLP

(57) ABSTRACT

A fuel water separator comprises a housing that defines an internal volume that receives a mixture. The fuel water separator further comprises a filter element that is positioned within the internal volume. The filter element comprises a first endplate and a second endplate that is located opposite the first endplate. The filter element further comprises a filter media that is coupled to the first endplate and the second endplate. The filter media is structured to separate a dispersed phase from a continuous phase of the mixture. The filter element further comprises a collection sump that is located below the first and second endplate and structured to receive the dispersed phase. The filter element further comprises a retention barrier disposed above the collection sump. The retention barrier comprises a drain opening structured to discharge the dispersed phase through the retention barrier into the collection sump.

9 Claims, 16 Drawing Sheets

Related U.S. Application Data

(60) Provisional application No. 62/542,044, filed on Aug. 7, 2017.

(56) References Cited

U.S. PATENT DOCUMENTS

| | | |
|---|---|---|
| 4,732,671 A | 3/1988 | Thornton et al. |
| 5,084,170 A | 1/1992 | Janik et al. |
| 5,951,862 A | 9/1999 | Bradford |
| 5,997,739 A | 12/1999 | Clausen et al. |
| 2007/0039865 A1 | 2/2007 | Jiang et al. |
| 2011/0006017 A1 | 1/2011 | Wieczorek et al. |
| 2012/0318728 A1 | 12/2012 | Eberle et al. |
| 2013/0153487 A1 | 6/2013 | Terry et al. |
| 2016/0258397 A1 | 9/2016 | Jiang et al. |
| 2017/0197160 A1 | 7/2017 | Salom et al. |

OTHER PUBLICATIONS

International Search Report from PCT Application No. PCT/US2018/045344, dated Oct. 18, 2018, pp. 1-2.
Written Opinion from PCT Application No. PCT/US2018/045344, dated Oct. 18, 2018, pp. 1-7.

* cited by examiner

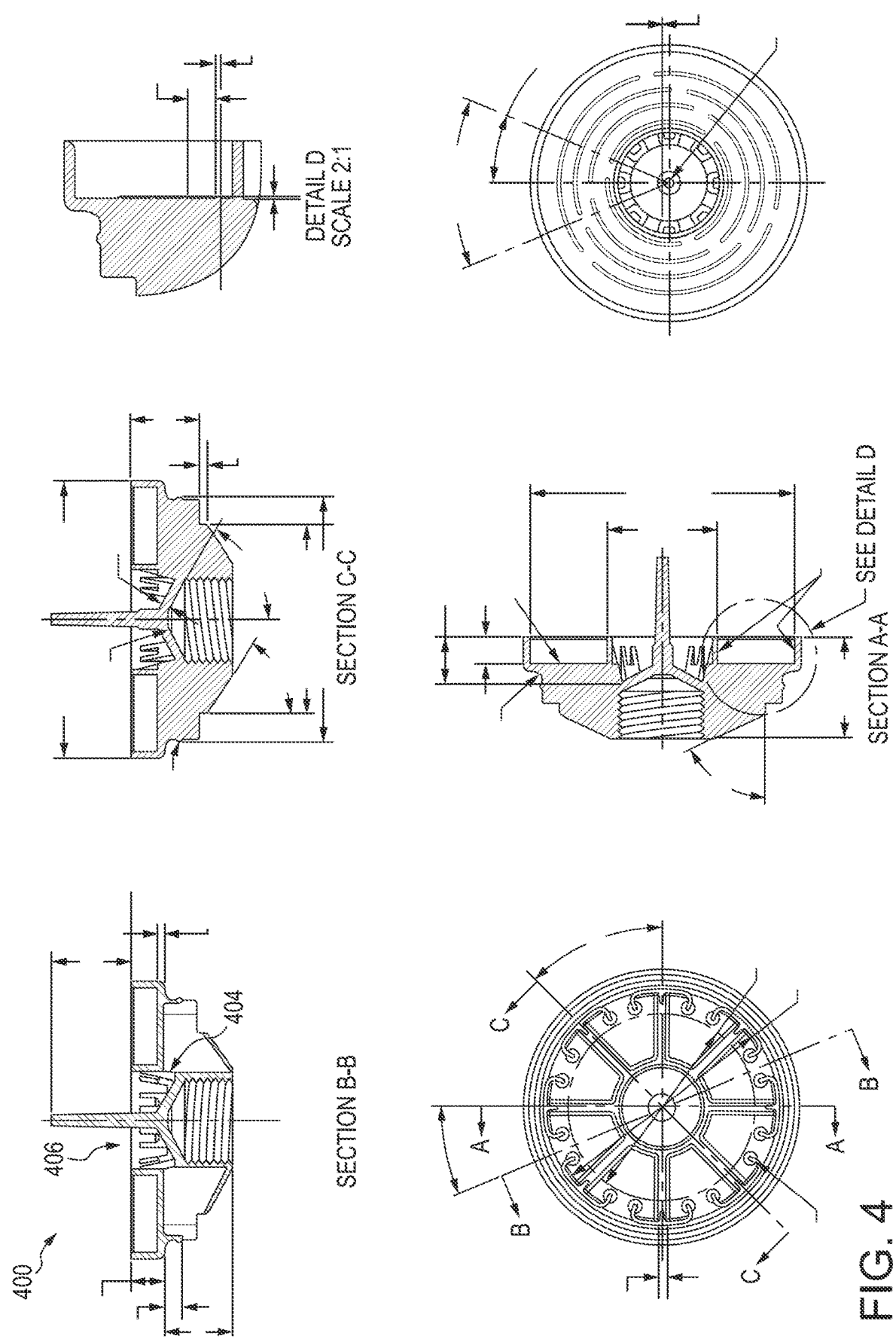

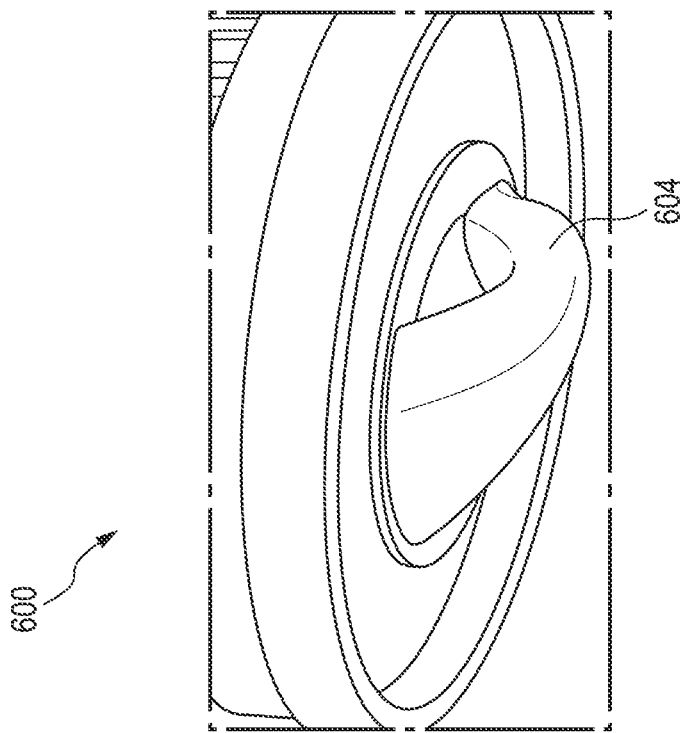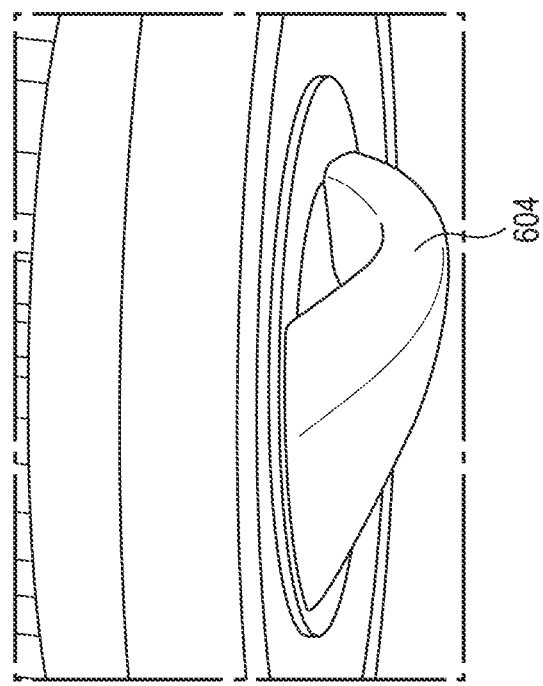
FIG. 6

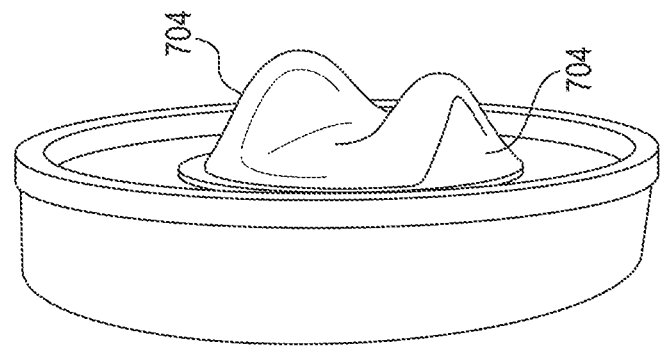
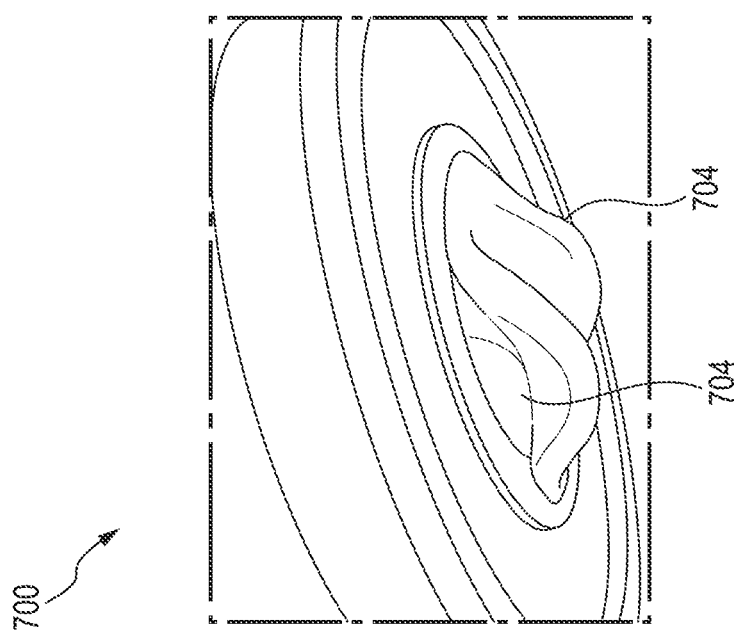
FIG. 7

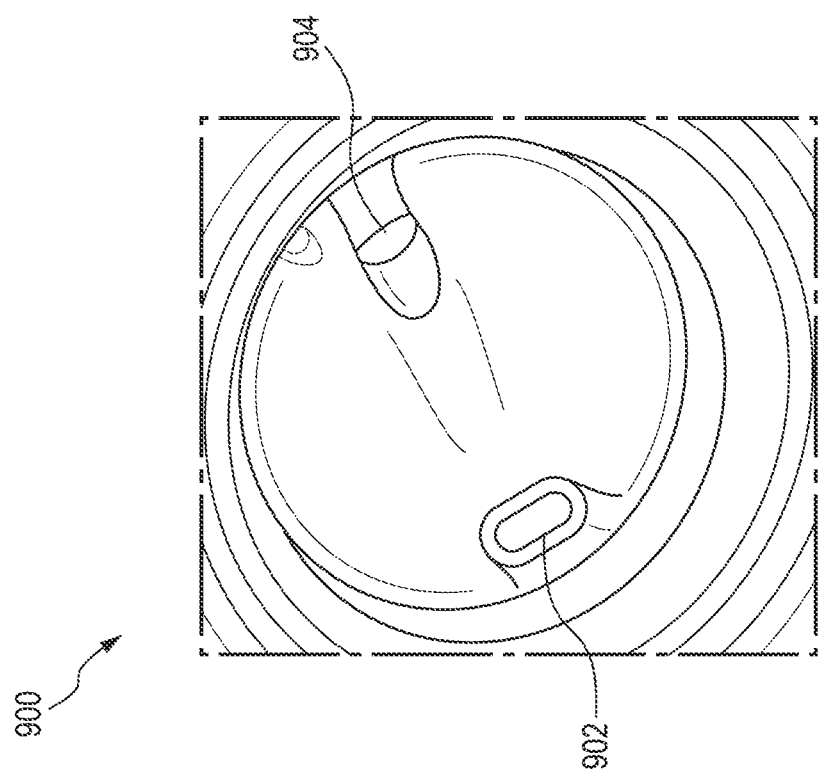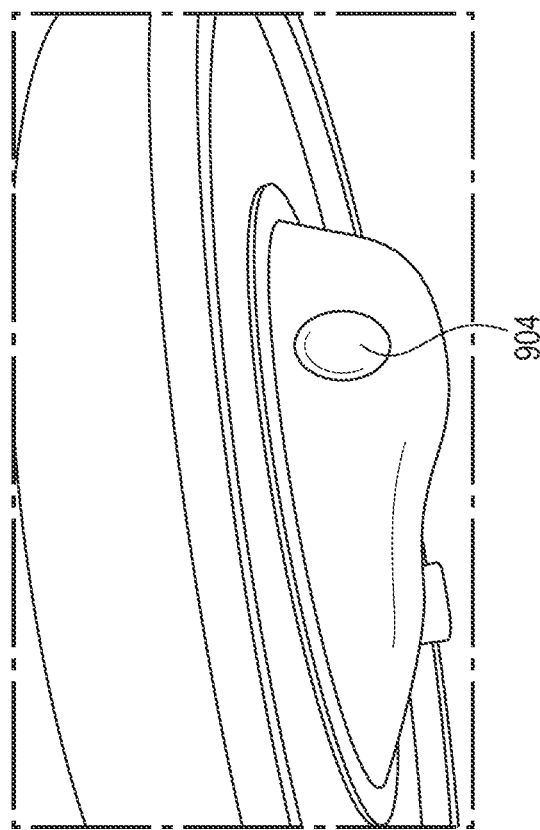
FIG. 9

WATER RETENTION BARRIER

CROSS-REFERENCE TO RELATED APPLICATIONS

This application is a Divisional of U.S. patent application Ser. No. 16/629,693, filed Jan. 9, 2020, which claims priority to PCT Patent Application No. PCT/US2018/045344, filed Aug. 6, 2018, and which claims priority to U.S. Provisional Application No. 62/542,044, filed Aug. 7, 2017, the contents of which are incorporated herein by reference.

TECHNICAL FIELD

The present application relates to coalescing filter elements.

BACKGROUND

Mixtures may include two immiscible constituents in various applications. For example, a mixture may have a continuous phase and a dispersed phase. Common mixtures include water and fuel (e.g., diesel, kerosene, gasoline, etc.), oil and water, water and air, oil and air, water and natural gas, and oil and natural gas. In many applications, it is desirable to separate the dispersed phase from the continuous phase. For example, the separation of the dispersed phase from the continuous phase is important in many industrial, commercial, and residential applications. In one application, removal of water (i.e., the dispersed phase) from fuel (i.e., the continuous phase) is important in fuel filtration for internal combustion engines because the water may cause corrosion of components within the internal combustion engines. One way to achieve the separation is to filter the mixture through a coalescing filter element (referred to as a "coalescer"). In many applications, including fuel-water separation, coalescers are used to achieve high contaminant (e.g., water droplets from fuel) removal.

Unlike particulate filters, coalescing filters (e.g., coalescers, etc.) are intended to capture and remove the dispersed phase from the continuous phase and to drain the dispersed phase from the coalescing filter media (e.g., filter media, etc.), not accumulate it indefinitely as done in typical particulate filters. In the absence of solid contaminant, coalescers can achieve a steady state, whereby the rate of dispersed phase entering the filter media equals the rate at which it is drained or released. The relative amount of contaminant held by the coalescing filter media is expressed as its "saturation." Drops of coalesced water are not subject to breakup by turbulence and readily settle into a water collection sump below the coalescer element. While the water collection sump is structured to retain water, in certain applications, for example off-road use, vibrations and movement may cause re-entrainment of released water drops back into the clean fuel stream.

SUMMARY

According to a set of embodiments, a fuel water separator comprises a housing that defines an internal volume that receives a mixture. The fuel water separator further comprises a filter element that is positioned within the internal volume. The filter element comprises a first endplate and a second endplate that is located opposite the first endplate. The filter element further comprises a filter media that is coupled to the first endplate and the second endplate. The filter media is structured to separate a dispersed phase from a continuous phase of the mixture. The filter element further comprises a collection sump that is located below the first and second endplate and structured to receive the dispersed phase. The filter element further comprises a retention barrier disposed above the collection sump (i.e., between the filter media and the collection sump). The retention barrier comprises a drain opening structured to discharge the dispersed phase through the retention barrier into the collection sump.

According to another set of embodiments, a fuel water separator comprises a housing defining an internal volume, the internal volume receiving a mixture. A filter element is positioned within the internal volume. The filter element comprises a first endplate, a second endplate located opposite the first endplate, and a filter media coupled to the first endplate and the second endplate. The filter media is structured to separate a dispersed phase from a continuous phase of the mixture. A collection sump is located below the first and second endplate. The collection sump is structured to receive the dispersed phase. A retention barrier is disposed above the collection sump. The retention barrier comprises a retention bowl, a drain opening, and a vent tube. The retention bowl comprises an edge wall. The drain opening is structured to discharge the dispersed phase through the retention barrier into the collection sump. The vent tube extends vertically above the edge wall.

These and other features, together with the organization and manner of operation thereof, will become apparent from the following detailed description when taken in conjunction with the accompanying drawings, wherein like elements have like numerals throughout the several drawings described below.

BRIEF DESCRIPTION OF THE FIGURES

FIG. 4 shows various detailed views of a water retention barrier, according to yet another example embodiment.

FIG. 6 shows a pair of perspective views of a water retention barrier, according to another example embodiment.

FIG. 7 shows a pair of perspective views of a water retention barrier, according to a further example embodiment.

FIG. 9 shows a pair of perspective views of a water retention barrier, according to another example embodiment.

DETAILED DESCRIPTION

Figure 1A:
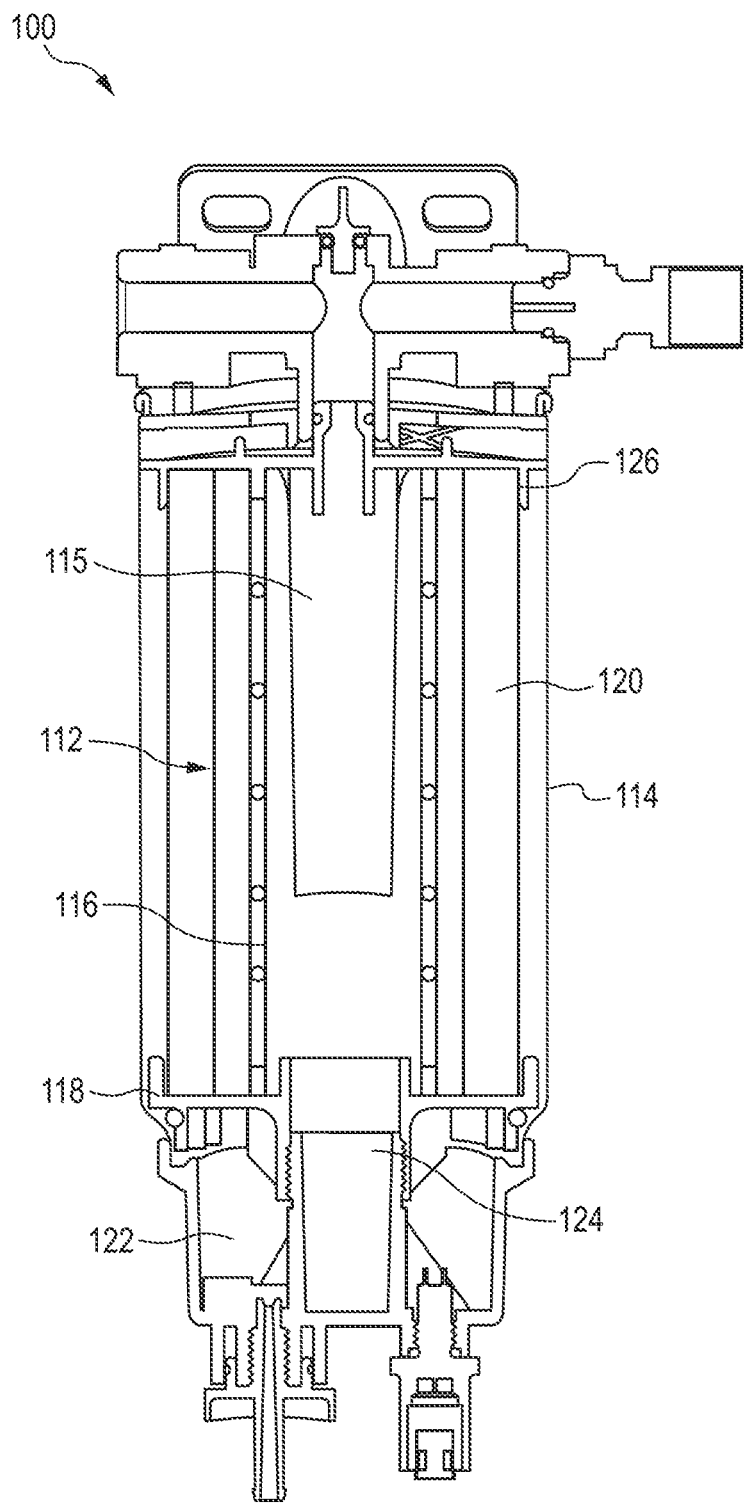
FIG. 1A shows a cross-sectional view of a fuel water separator without a water retention barrier.

Referring to the figures generally, various fuel water separators ("FWS") having a water retention barrier are described. As described herein, a FWS is a subset (e.g., a particular type, etc.) of a filter assembly. The FWS may use coalescers to remove water from fuel. A FWS can include a single-stage, barrier type, water separator or a fuel-water coalescing filter. In some embodiments, the FWS includes coalescing filter media structured to separate a dispersed phase from a continuous phase of a mixture. In various embodiments described herein, the filter media is implemented within a FWS and structured to separate water (e.g., a dispersed phase, etc.) from a fuel (e.g., a continuous phase, etc.) within a fuel-water mixture. However, the filter media may also be implemented in other applications where separation of a dispersed phase from a continuous phase is desirable. For example, the filter media may be implemented in a crankcase to facilitate crankcase ventilation to separate oil and water droplets from blowby gas, in an oil (e.g., lube, hydraulic oil, etc.) circulation system to separate water from the oil, and in a natural gas system to remove water or oil mist from natural gas.

Generally, as a mixture (e.g., fuel or lubricant and water) passes through the filter media of a filter element of the FWS, the water is captured and coalesced by the filter media. The coalesced water falls axially along the filter media in the direction of gravity and into a water collection sump formed below the filter element. In strong vibration environments (e.g., off-road usage), water in the water collection sump is in motion and may be shaken vertically by the vehicle movement and vibration. Accordingly, there is a risk that the water is shaken out of the water collection sump and reintroduced into the clean fuel stream. However, a FWS with water retention barrier according to the embodiments provided herein is structured to limit re-entrainment back into the cleaned fuel of the released water drops in a water collection sump.

Generally, the water retention barrier is disposed on the bottom of a filter element above the water collection sump and downstream of the filter media, i.e., the retention barrier is disposed between the filter media and the collection sump. The water retention barrier facilitates the coalesced water into the water collection sump through at least one drain opening and prevents reentry of the coalesced water into to the clean fuel stream inside of the filter media. The water retention barrier may have a plurality of drain openings. The drain opening may be structured to discharge the coalesced water substantially radially along the filter element (e.g., radially to the filter element central axis) into the water collection sump, in contrast to FWS that discharge the coalesced axially along the filter element. In some embodiments, the drain openings may be structured to discharge the coalesced water substantially non-radially along the filter element. The water retention barrier may include a retention bowl that captures coalesced water and is substantially sloped to facilitate movement of the coalesced water through the drain opening(s) into the water collection sump. In some embodiments, a drain opening includes a vertical vent tube (e.g., chimney) that extends above the water collection sump inlet and facilitates displaced fuel or lubricant back to the filter element.

In some embodiments, the water retention barrier comprises a separate component that is snap fit or coupled into a receiving flow passage (e.g., hole) in the middle of a bottom endplate. In other embodiments, the water retention barrier is integrally formed (e.g., molded) on a bottom endplate of the FWS. In other embodiments, the water retention barrier is integrally formed on the bottom of a center tube. In other embodiments, the water retention barrier is integrally formed on the bottom of a standpipe. In some embodiments, the water retention barrier includes a highly porous, hydrophilic material disposed on a side of the water retention barrier. In some embodiments, the water retention barrier includes a plurality of hydrophilic fibers disposed across the inner diameter of the bottom endplate that wick up the coalesced water.

Referring to FIG. 1A, a cross-sectional view of a FWS 100 without a water retention barrier is shown. The FWS 100 includes a filter element 112, a housing 114, a standpipe 115, a center tube 116, and a water collection sump 122. The FWS 100 is structured to separate two immiscible phases of a mixture (e.g., fuel or lubricant and water) into a continuous phase (e.g., herein referred to as "fuel") and a dispersed phase (herein referred to as "water"). As the mixture passes through the filter element 112, the dispersed phase is captured and coalesced. The coalesced water falls along the standpipe 115 (or center tube 116), in the direction of gravity, and axially enters the water collection sump 122.

The housing 114 includes a central compartment structured to receive the filter element 112. Although the housing 114 is shown arranged as a cylindrical housing having a circular cross-sectional shape, the housing 114 can be arranged in other shapes to receive the filter element 112. While the housing 114 and water collection sump 122 are shown as separate elements, in some embodiments, the water collection sump 122 is integrally formed with the housing 114. In some embodiments, the water collection sump 122 includes a vent hole.

The filter element 112 includes a first endplate 118, a second endplate 126, and filter media 120. In some arrangements, the filter element 112 is a cylindrical filter element. The filter element 112 may be, for example, a fuel filter element, an oil filter element, an air filter element, a crankcase ventilation filter element, a water filter, or the like. In some embodiments, the standpipe 115 is integrally formed with the filter element 112. Both the first endplate 118 and the second endplate 126 of the filter element 112 are open endplates (i.e., include at least one opening therein).

The filter media 120 is structured to separate two immiscible phases of a mixture into the fuel or lubricant and water. Accordingly, as the mixture passes through the filter media 120, the water is captured and coalesced by the filter media 120. The coalesced water falls along the inside of the filter element 112, in the direction of gravity, to the central region 124 of the water collection sump 122. As the coalesced water falls, the coalesced water may or may not contact the filter media 120. As will be appreciated, if the FWS 100 is subject to movement or vibrations, the coalesced water in the water collection sump 122 may begin to travel up the water collection sump 122 toward the first endplate 118. If the vibrations and movement are significant enough, the coalesced water will re-enter the standpipe 115 and mix with the clean fuel.

The standpipe 115 extends from the clean fuel outlet at the second endplate 126 axially along the filter element 112 to the first endplate 118. In some embodiments, the standpipe 115 includes flow passages along the side walls that allow for clean fuel to exit the filter element 112 therethrough. The flow passages may be positioned symmetrically or asymmetrically around the standpipe 115 and may vary in shape (e.g., round, oval, slots, etc.).

Figure 1B:
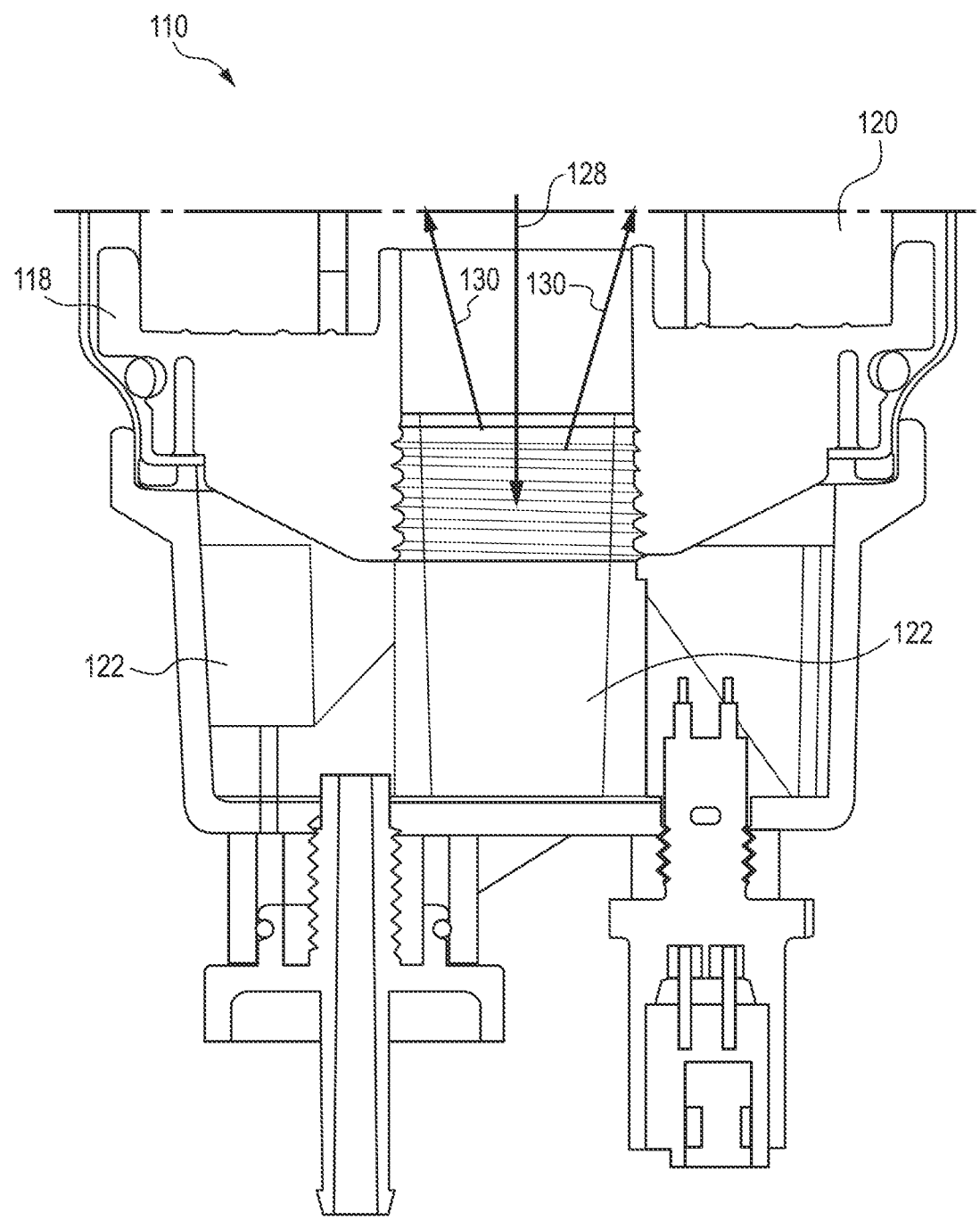
FIG. 1B shows a cross-sectional view of a flow to the water collection sump of the fuel water separator of FIG. 1A.

Referring to FIG. 1B, a cross-sectional view of a flow to the water collection sump 122 of the FWS 100 of FIG. 1A is shown. Under normal conditions (e.g., low vibration and low movement), the coalesced water flows 128 along the center tube 116 in the direction of gravity to the water collection sump 122. The coalesced water accumulates in the water collection sump 122 and may be drained from the water collection sump 122, outside of the FWS 100. If the FWS 100 undergoes excessive movement or vibrations while the coalesced water is in the water collection sump, inertial forces may begin to cause the coalesced water to be propelled upward (represented by arrows 130) from the water collection sump 122 toward the first endplate 118. If the vibrations and movement are significant enough, the coalesced water will be propelled out of the water collection sump 122, re-enter the filter element 112, and mix with the clean fuel.

Figure 2A:
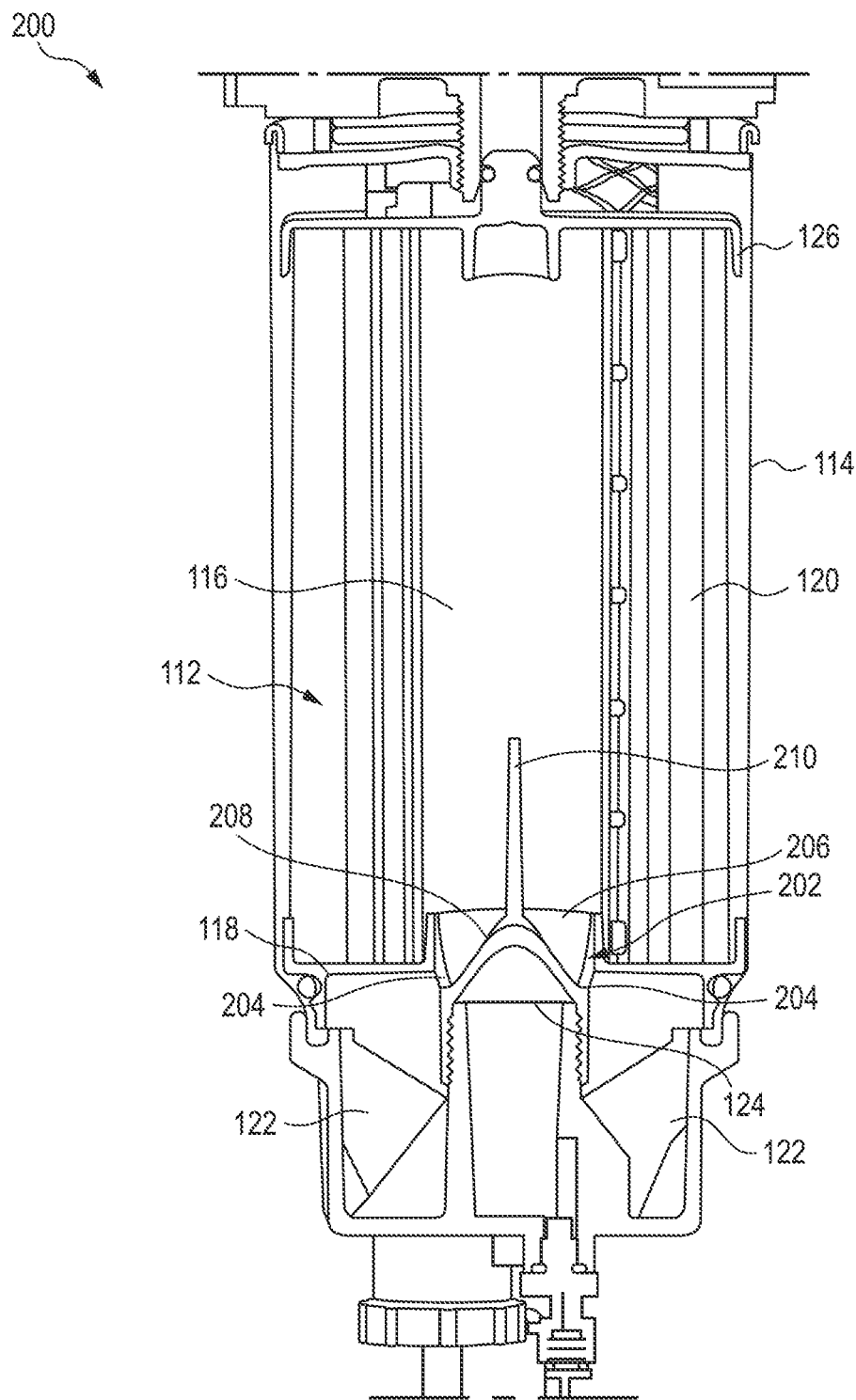
FIG. 2A shows a cross-sectional view of a fuel water separator with a water retention barrier, according to an example embodiment.

Referring to FIG. 2A, a cross-sectional view of a FWS 200 with a water retention barrier 202 is shown, according to an example embodiment. The FWS 200 is similar to the FWS 100. A difference between the FWS 200 and the FWS 100 is the use of a water retention barrier 202 in the FWS 200. Accordingly, like numbering is used to designate like parts between the FWS 200 and the FWS 100. The FWS 200 includes a filter element 112, a housing 114, a center tube 116, a water collection sump 122, and a water retention barrier 202. As will be appreciated, the water retention barrier 202 of the FWS 200 prevents coalesced water in the water collection sump 122 from being propelled by inertial forces, re-entering the filter element 112, and mixing with the clean fuel.

The housing 114 includes a central compartment structured to receive the filter element 112. Although the housing 114 is shown arranged as a cylindrical housing having a circular cross-sectional shape, the housing 114 can be arranged in other shapes to receive the filter element 112. While the housing 114 and water collection sump 122 are shown as separate elements, in some embodiments, the water collection sump 122 is integrally formed with the housing 114.

The filter element 112 includes a first endplate 118, a second endplate 126, a filter media 120, and a water retention barrier 202. While the water retention barrier 202 is shown in FIG. 2A as being integrally formed with the first endplate 118, in other embodiments, described in greater detail below, the water retention barrier 202 is a separate piece or integrally formed with other elements of the FWS 200. Both the first endplate 118 and the second endplate 126 of the filter element 112 are open endplates (i.e., include at least one opening therein). In some embodiments, the first endplate 118 has a vent disposed on a surface near the water collection sump 122. In other embodiments, no vents are needed.

The filter media 120 is structured to separate two immiscible phases of a mixture into the fuel or lubricant and water. Accordingly, as the mixture passes through the filter media 120, the water is captured and coalesced by the filter media 120. The coalesced water falls along the filter media 120 in the direction of gravity toward the water retention barrier 202. As the coalesced water falls, the coalesced water may or may not contact the filter media 120.

The center tube 116 extends from the clean fuel outlet at the second endplate 126 axially along the filter element 112 to the first endplate 118. In some embodiments, the center tube 116 includes flow passages along the side walls that allow for clean fuel to exit the filter element 112 therethrough. The openings defining the flow passages may be positioned symmetrically around the center tube 116 and may vary in shape (e.g., round, oval, slots, etc.).

The water retention barrier 202 includes drain openings 204, a retention bowl 206, an angled surface 208, and a protruding member 210. The water retention barrier 202 of the FWS 200 prevents coalesced water in the water collection sump 122 from re-entering the filter element 112 and mixing with the clean fuel. As will be appreciated, the water retention barrier 202 is structured to discharge the coalesced water radially along the first endplate 118—in contrast to the discharge of the coalesced water axially along the filter element 112 in the FWS 100 of FIG. 1A. By disposing the water retention barrier 202 over a central region of the water collection sump 122 and structuring the drain openings 204 to discharge the coalesced water radially, the water retention barrier 202 prevents coalesced water from being propelled by inertial forces and re-entering the filter element 112. In some embodiments, the water retention barrier 202 has an outer diameter in the range of 45-50 mm.

As shown in FIG. 2A, the water retention barrier 202 is disposed on the inner diameter of the first endplate 118 such that the retention bowl 206 is able to capture the coalescing water. The retention bowl 206 covers the central region 124 of the water collection sump 122 and prevent fluid movement therethrough. The retention bowl 206 includes drain opening(s) 204 disposed along a surface of the retention bowl 206. In some embodiments, one or more drain openings 204 are disposed along the edge wall that comprises the circumference of the retention bowl 206. In some embodiments, the edge wall is approximately 7 mm tall. The retention bowl 206 further includes a substantially angled surface 208 that facilitates movement of coalesced water around the middle of the retention bowl 206 to the edge of the retention bowl 206 and through the drain openings 204. The angled surface 208 is slanted downward from the central region of the retention bowl 206 toward the edge of the retention bowl 206. In some embodiments, the angled surface 208 is substantially flat.

The angled surface 208 includes a substantially vertical protruding member 210 disposed at the central region of the angled surface 208. Utilizing gravity, the protruding member 210 further facilitates movement of coalesced water at the central region of the retention bowl 206 to the edge of the retention bowl 206 and through the drain openings 204. As will be appreciated, the protruding member 210 can vary in height or shape as needed to facilitate the movement of coalesced water at the apex of the angled surface 208, down the angled surface 208, to the edge of the retention bowl 206, and through the drain openings 204. In some embodiments, the angled surface 208 does not include a protruding member 210.

The drain openings 204 are structured to discharge the coalesced water radially along the first endplate 118. As will be appreciated, the shape and angle of the drain openings 204—in combination with the bottom surface of the water retention barrier 202 being disposed over the central region 124 of the water collection sump 122—prevent coalesced water in the water collection sump 122 from re-entering the filter element 112 during periods of high vibration or movement of the FWS 200. In some embodiments, one or more drain openings 204 may be disposed along the angled surface 208.

The "drain opening" refers to an opening in the water retention barrier 202 that may have a cross-section of a wide variety of target shapes. For example, a drain opening 204 may be round in cross-section, irregularly shaped, a slot, a slit, or puncture of another shape as previously defined. The term "drain opening" refers to the larger openings in the water retention barrier 202 above the water collection sump 122 that serve the primary purpose of permitting the coalesced water to drain from the filter element 112 into the water collection sump 122. The drain openings 204 in the water retention barrier 202 may be produced, for example, by molding the water retention barrier 202, molding an endplate, injection molding, puncturing the water retention barrier 202 (or similar surface) with pins or punches, making slits of short length with a (flat) bladed object, burning holes in the water retention barrier 202 with an infrared laser, ultrasonic wave, using water jets, melting a water retention barrier 202 using hot pins. In particular embodiments, the drain openings 204 include a crescent shape with diameters of 5.6 mm, 6.35 mm, 7.94 mm, 9.53 mm, or there between. In some embodiments, the drain openings 204 are round and vented with diameters of 5.6 mm, 6.35 mm, 7.94 mm, 9.53 mm, or there between.

While the water retention barrier 202 of FIG. 2A is shown with a plurality of drain openings 204, other embodiments of the water retention barrier 202 may include only one or more drain openings 204 tailored to facilitate drainage of the coalesced water. The number of drain opening(s) 204 may affect the placement of the drain opening(s) 204. For example, a radially draining, single drain opening 204 may be disposed at the central region of the water retention barrier 202. With a single drain opening 204, the angled surface 208 may be substantially angled downward from the edge of the retention bowl 206 toward the central region of the water retention barrier 202. In embodiments with a single drain opening, the diameter of the single drain opening 204 can be in the range of 4.3-7.1 mm, for example, and an even larger drain opening (such as in the range of 9.0-12.0 mm) may be used for other applications with greater flow requirements.

It should be understood that FIG. 2A is illustrative and not indicative of all potential water retention barrier 202 combinations; other combinations of drain openings 204 and dispositions are contemplated. For example, in some embodiments, the water retention barrier 202 is not integrally formed with the first endplate 118 and is a separate piece. In those embodiments, the water retention barrier 202 is snap fit into or affixed to the central region of the first endplate 118. The snap fit of the water retention barrier 202 allows for retro-fitting and ensures that the central region 124 of the water collection sump 122 is covered. In these embodiments, the water retention barrier 202 may have a "mushroom" shape including a stem portion that snap fit into or affixed to the central region of the first endplate 118. In these embodiments a center tube 116 is optional.

In some embodiments, the water retention barrier 202 is integrally formed with the standpipe (not shown). In those embodiments, the water retention barrier 202 is molded onto the bottom of the standpipe. The water retention barrier 202 has a diameter slightly smaller than the inner diameter of the standpipe. Because the water retention barrier 202 is molded onto the standpipe, the thickness of the water retention barrier 202 is in the range of about 1.5-3 mm. If the standpipe includes sidewall flow passages for filtered fuel to exit, the flow passages will extend from the end of the sidewall near the second endplate 126, to approximately two-thirds down the vertical length of the standpipe in the direction of the first endplate 118. In other embodiments, the water retention barrier 202 is integrally formed with the center tube 116. As will be appreciated, the water retention barrier 202 may be integrally formed with one or more components of the FWS 200.

In some embodiments, the water retention barrier 202 includes a highly porous, hydrophilic material on a surface of the water retention barrier 202. The porous, hydrophilic material is structured to promote water collection and drainage. Accordingly, the porous, hydrophilic material may be disposed on the angled surface 208 or other location between the center tube 116 and the drain openings 204. Alternatively, the porous, hydrophilic material may be disposed on the bottom of the water retention barrier in contact with water collection sump 122.

In other embodiments, the water retention barrier 202 includes a plurality of hydrophilic fibers attached across the diameter of the water retention barrier 202. In those embodiments, a single, large drain opening 204 is disposed at the central region of the water retention barrier 202. Further, the filter media 120 includes one or more perforations. The perforations are created by incorporating holes into an unperforated layer of filter media 120. The perforations facilitate the drainage of the coalesced water through the filter media 120 and have a perforation outlet at the base of the filter media 120. As coalesced water exits the perforation, it is wicked up by the hydrophilic fibers and drains into the water collection sump 122 through the flow passage in the central region of the water retention barrier 202 (and by extension the central region of the first endplate 118). The water retention barrier 202 can be attached in any number of ways, including clipping it in place with a fastener, adhesively attaching, crimping in place, or molding it onto the center tube 116 end or the first endplate 118. As will be appreciated, the hydrophilic fibers form a pad-like water barrier between the flow region of the center tube 116 and the water collection sump 122.

Figure 2B:
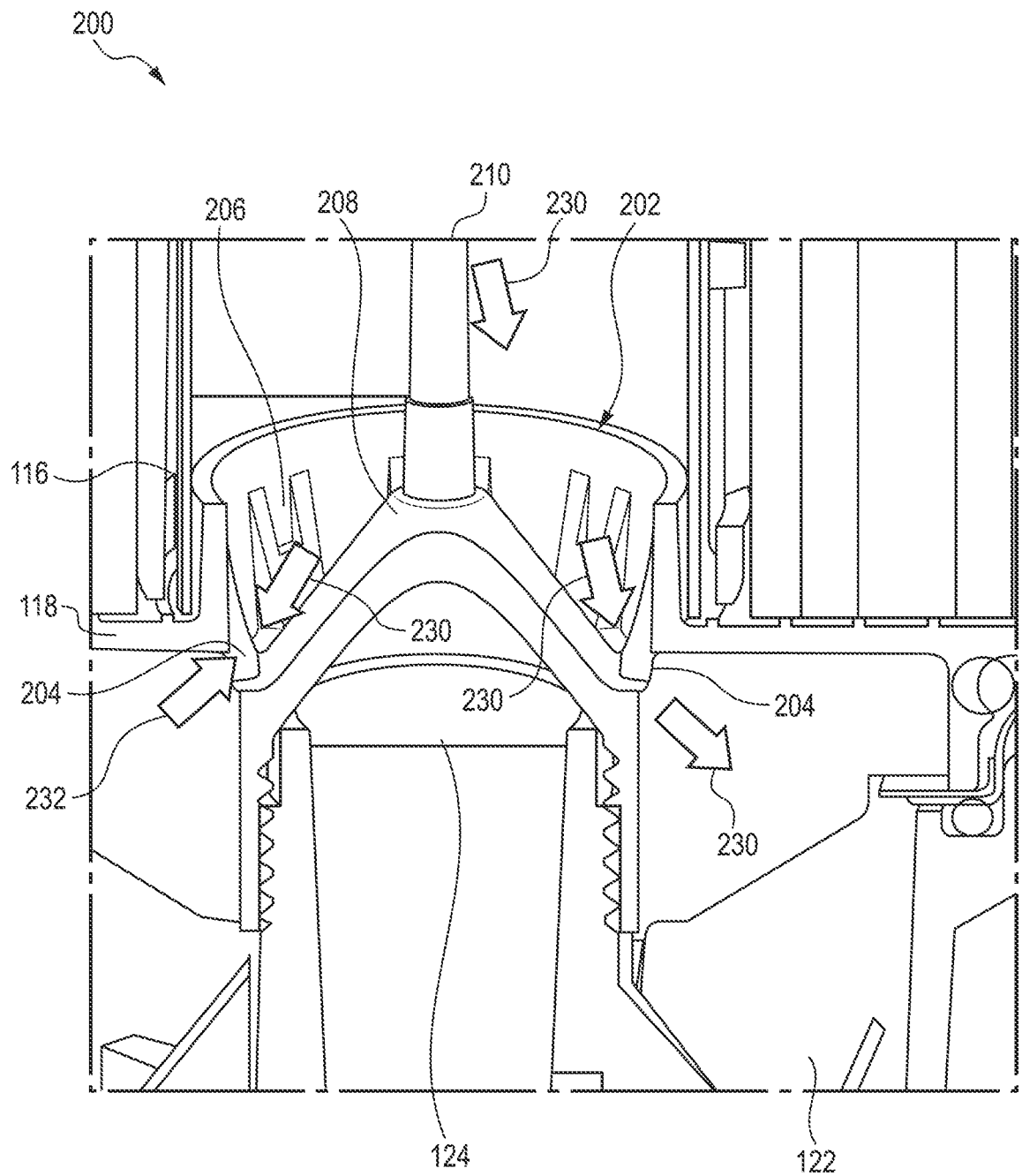
FIG. 2B shows a cross-sectional view of a flow through the water retention barrier of the fuel water separator with water retention barrier of FIG. 2A.

Referring to FIG. 2B, a cross-sectional view of a flow 230 through the water retention barrier 202 of the FWS 200 of FIG. 2A is shown. The coalesced water flows 230 along the center tube 116 in the direction of gravity toward the retention bowl 206 of the water retention barrier 202. Depending on the flow 230 of the coalesced water, the coalesced water flow 230 may come in contact with the protruding member 210 or the angled surface 208. If the coalesced water flow 230 contacts the protruding member 210 or the angled surface 208, gravity and the structure of the elements cause the coalesced water flow 230 to travel towards and through the drain openings 204. Once disposed in the water collection sump 122 through the drain openings 204, the coalesced water is prevented from being propelled by inertial forces and re-entering the flow region of filter element 112. This prevention is a result of the angle and location of the drain openings 204 and the disposition of the water retention barrier 202 over the central region 124 of the water collection sump 122. This re-entry prevention occurs even when the FWS 200 undergoes movement or vibrations while the coalesced water is in the water collection sump. In some embodiments, the drain opening 204 may be structured to allow displaced fuel 232 to leave the water collection sump 122 and re-enter the filter element 112. In some embodiments, as the coalesced water flow 230 passes through the drain openings 204, an equal amount of fuel is vented 232 upward through the drain openings 204.

Figure 3A:
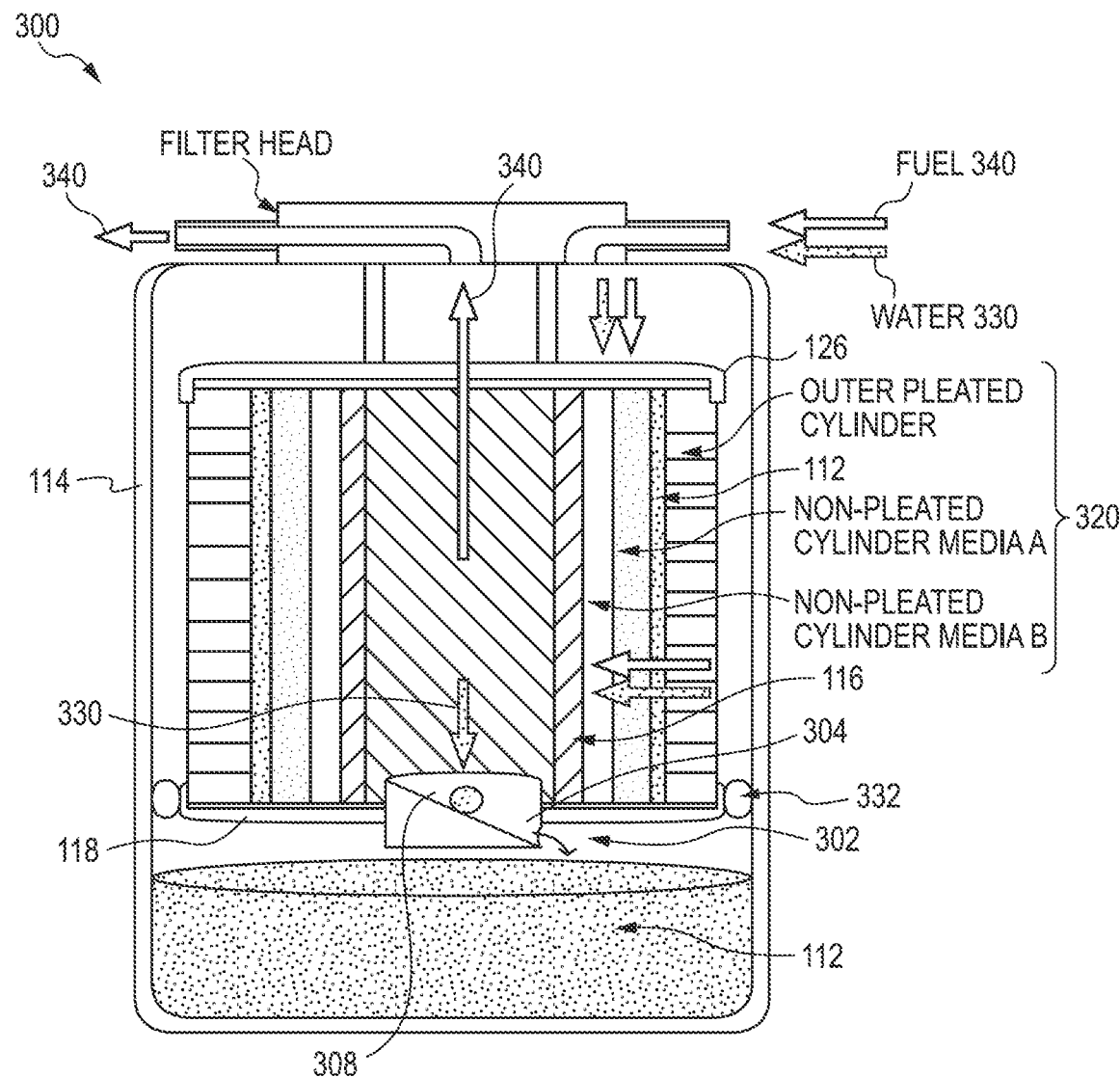
FIG. 3A shows a cross-sectional view of the fuel and water flow in an outside-in fuel water separator with water retention barrier, according to another example embodiment.

Referring to FIG. 3A, a cross-sectional view of the fuel flow 340 and water flow 330 in an outside-in FWS 300 is shown, according to another example embodiment. The FWS 300 is similar to the FWS 200. A difference between the FWS 300 and the FWS 200 is angled surface 308 the lack of a protruding member of the FWS 300. Accordingly, like numbering is used to designate like parts between the FWS 300 and the FWS 200. As shown in FIG. 3A, flow occurs radially, from outside of the cylindrical filter element 112 to inside the cylindrical filter element 112. Both the first endplate 118 and the second endplate 126 of the filter element 112 are open endplates (i.e., include at least one opening therein). The second endplate 126 receives a mixture of fuel 340 and water 330 from the filter head into the channel. The second endplate 126 provides a channel for substantially water-free fuel 340 to leave the FWS 300 and go to the component through a filter head. The first endplate 118 is open to provide access for settling water drops to reach the water retention barrier 302. A gasket 332 is used to separate wet and dry fuel sides of the FWS 300. The coalesced water flows 330 along the center tube 116 in the direction of gravity toward the retention bowl 206 of the water retention barrier 302. The coalesced water flow 330 contacts the angled surface 308 and gravity and the structure of the elements cause the coalesced water flow 330 to travel towards and through the drain opening 304. Once disposed in the water collection sump 122 through the drain opening 304, the coalesced water is prevented from being propelled by inertial forces and re-entering the flow region of the filter element 112. This prevention is a result of the angle and location of the drain opening 304 and the disposition of the water retention barrier 302 over the central region 124 of the water collection sump 122. This prevention occurs even when the FWS 300 undergoes movement or vibrations while the coalesced water is in the water collection sump.

Figure 3B:
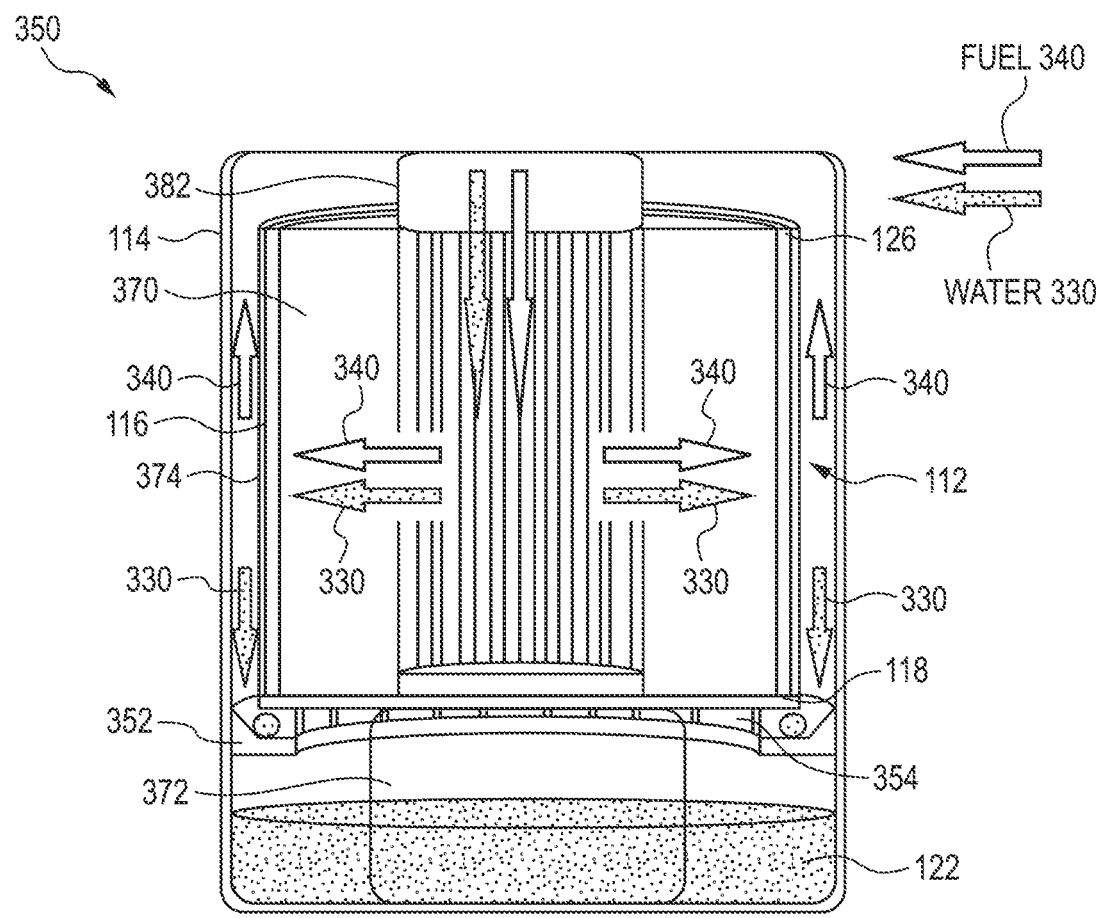
FIG. 3B shows a cross-sectional view of the fuel and water flow in an inside-out fuel water separator with water retention barrier, according to yet another example embodiment.

Referring to FIG. 3B, a cross-sectional view of the fuel flow 340 and water flow 330 in an inside-out FWS 350 is shown, according to another example embodiment. The FWS 350 is similar to the FWS 300. A difference between the FWS 350 and the FWS 300 is the FWS 350 is an inside-out coalescer. Accordingly, like numbering is used to designate like parts between the FWS 350 and the FWS 300. As shown in FIG. 3B, flow occurs radially, from inside of the cylindrical filter element 112 to outside of the cylindrical filter element 112. The first endplate 118 is a closed endplate. The second endplate 126 of the filter element 112 is an open endplate (i.e., include at least one opening therein). A mixture of fuel 340 and water 330 passes from the filter head, through the opening of the second endplate 126, and into the channel where a gasket 382 is used to separate wet and dry fuel sides. The outside of the filter element 112 and the housing 114 provide a channel for substantially water-free fuel 340 to leave the FWS 350 and go to the component through a filter head. The first endplate 118 is closed to facilitate water drops reaching the water retention barrier 302. The water retention barrier 352 is disposed below the closed first end plate 118 and above the water collection sump 122.

The mixture of fuel 340 and water 330 flows radially from inside the pleated filter media 370 to outside the pleated filter media 370. The center tube 116 and a coalescing wrap 374 are disposed outside of the pleated filter media 370 to facilitate further coalescing. The coalesced water flows 330 along the area formed between the sides of the housing 114 and center tube 116 in the direction of gravity toward the retention bowl 206 of the water retention barrier 352. The coalesced water flow 330 contacts the angled surface 308 and gravity and the structure of the elements cause the coalesced water flow 330 to travel towards and through the drain opening 354. Once disposed in the water collection sump 122 through the drain opening 354, the coalesced water is prevented from being propelled by inertial forces and re-entering the flow region of the filter element 112. This prevention is a result of the angle and location of the drain opening 354 and the disposition of the water retention barrier 352 under the closed first endplate 118 and above the central region 124 of the water collection sump 122. This prevention occurs even when the FWS 350 undergoes movement or vibrations while the coalesced water is in the water collection sump. In some embodiments, a spacing element 372 is disposed between the water retention barrier 352 and the water collection sump 122.

Referring to FIG. 4, a detailed version of the water retention barrier 400 is shown, according to another example embodiment. In some embodiments, the water retention barrier 400 has eight drain openings 404 around the perimeter of an edge wall of a retention bowl 406. However, the number of drain openings 404 may vary. As will be appreciated, the water retention barrier 400 may be used as the water retention barrier for the FWS 200 of FIGS. 2A & 2B.

Figure 5A:
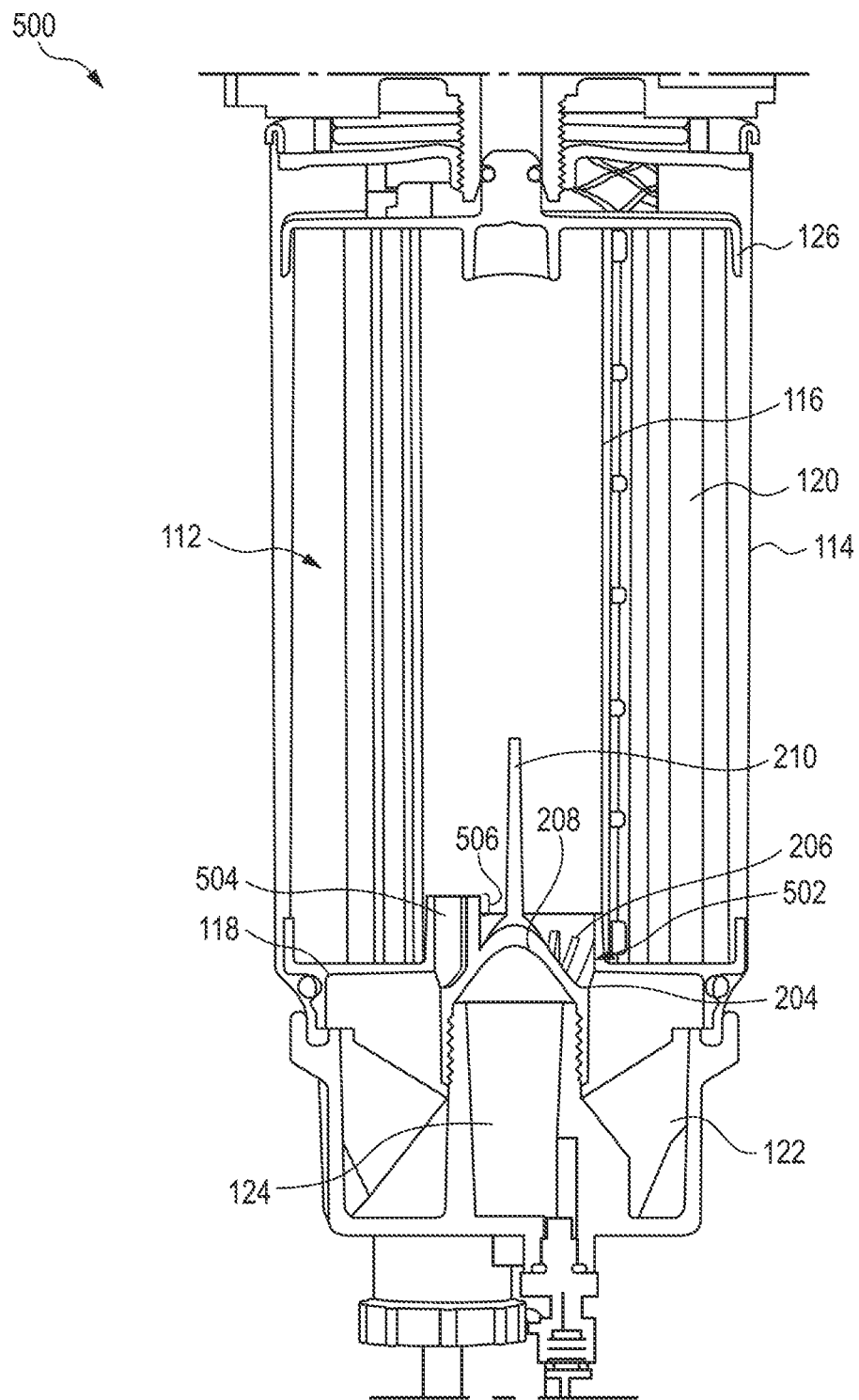
FIG. 5A shows a cross-sectional view of a fuel water separator with a water retention barrier with a vertical vent tube, according to an example embodiment.

Referring to FIG. 5A, a cross-sectional view of a FWS 500 with a water retention barrier 502 with a vertical vent tube 504 is shown, according to an example embodiment. The FWS 500 is similar to the FWS 200. A difference between the FWS 500 and the FWS 200 is the use of a chimney water retention barrier in the FWS 200. Accordingly, like numbering is used to designate like parts between the FWS 500 and the FWS 200. For brevity, the description of the FWS 500 will focus on the vertical vent tube 504. As will be appreciated, the water retention barrier 502 of the FWS 500 allows for displaced fuel to return to the filter element 112, in addition to preventing coalesced water in the water collection sump 122 from re-entering the filter element 112 and mixing with the clean fuel.

The water retention barrier 502 includes a drain opening 204, a retention bowl 206, an angled surface 208, a protruding member 210, and a vertical vent tube 504. The water retention barrier 502 is similar to the water retention barrier 202. A difference is the water retention barrier 502 includes a vertical vent tube 504.

The vertical vent tube 504 serves as a passageway for displaced fuel to rise up and leave the water collection sump 122. As will be appreciated, fuel may become displaced and drain into, or get captured by, the water collection sump 122. Due to the surface tension between water and fuel, it is difficult for water and fuel to both pass through the same drain opening 204 at the same time. Thus, if one or more drain opening 204 is covered with water, fuel would be unable to escape as water coming down the drain opening 204 prevents the fuel from going up the drain opening 204. The vertical vent tube 504 is for fuel only and provide a dedicated passage for displaced fuel to leave the water collection sump 122. As will be appreciated, due to the clearance 506 of the vertical vent tube 504, there is no interaction with water and interfacial tension in the vertical vent tube 504. This is a result of the top of the vertical vent tube 504 having a clearance 506 above the level of where the water could potentially spill over from the water collection sump 122 and into the water retention barrier 502.

Figure 5B:
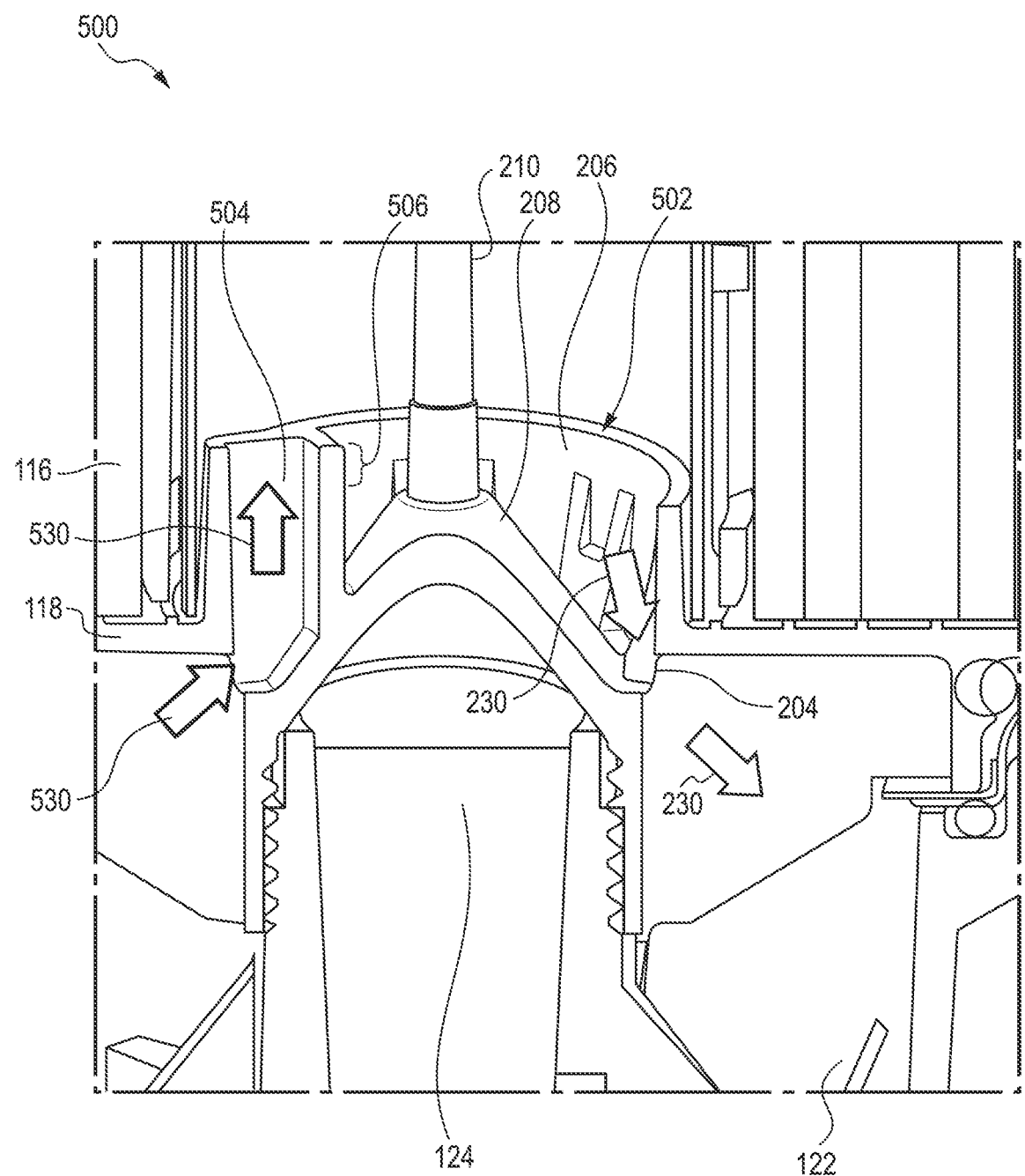
FIG. 5B shows a cross-sectional view of the water retention barrier with the vertical vent tube of the fuel water separator of FIG. 5A.

FIG. 5B shows a cross-sectional view of the water retention barrier 502 with a vertical vent tube 504 of the FWS 500 of FIG. 5A. The coalesced water flows 230 along the center tube 116 in the direction of gravity toward the retention bowl 206 of the water retention barrier 502. Depending on where the flow 230 of the coalesced water, the coalesced water flow 230 may come in contact with the protruding member 210 or the angled surface 208. If the coalesced water flow 230 contacts the protruding member 210 or the angled surface 208, gravity and the structure of the elements cause the coalesced water flow 230 to travel towards and through the drain openings 204. Once disposed in the water collection sump 122 through the drain openings 204, the coalesced water is prevented from re-entering the flow region of the center tube 116. This prevention is a result of the angle and location of the drain openings 204 and the disposition of the water retention barrier 202 over the central region 124 of the water collection sump 122. This prevention occurs even when the FWS 500 undergoes movement or vibrations while the coalesced water is in the water collection sump. The vertical vent tube 504 is disposed opposite the drain opening 204 (relative a center of the retention barrier 502) and has a clearance 506 above the level of the water that could potentially spill over from the water collection sump 122 and into the water retention barrier 502. Accordingly, the displaced fuel leaves 530 the water collection sump 122 and back into the filter element 112.

Figure 5C:
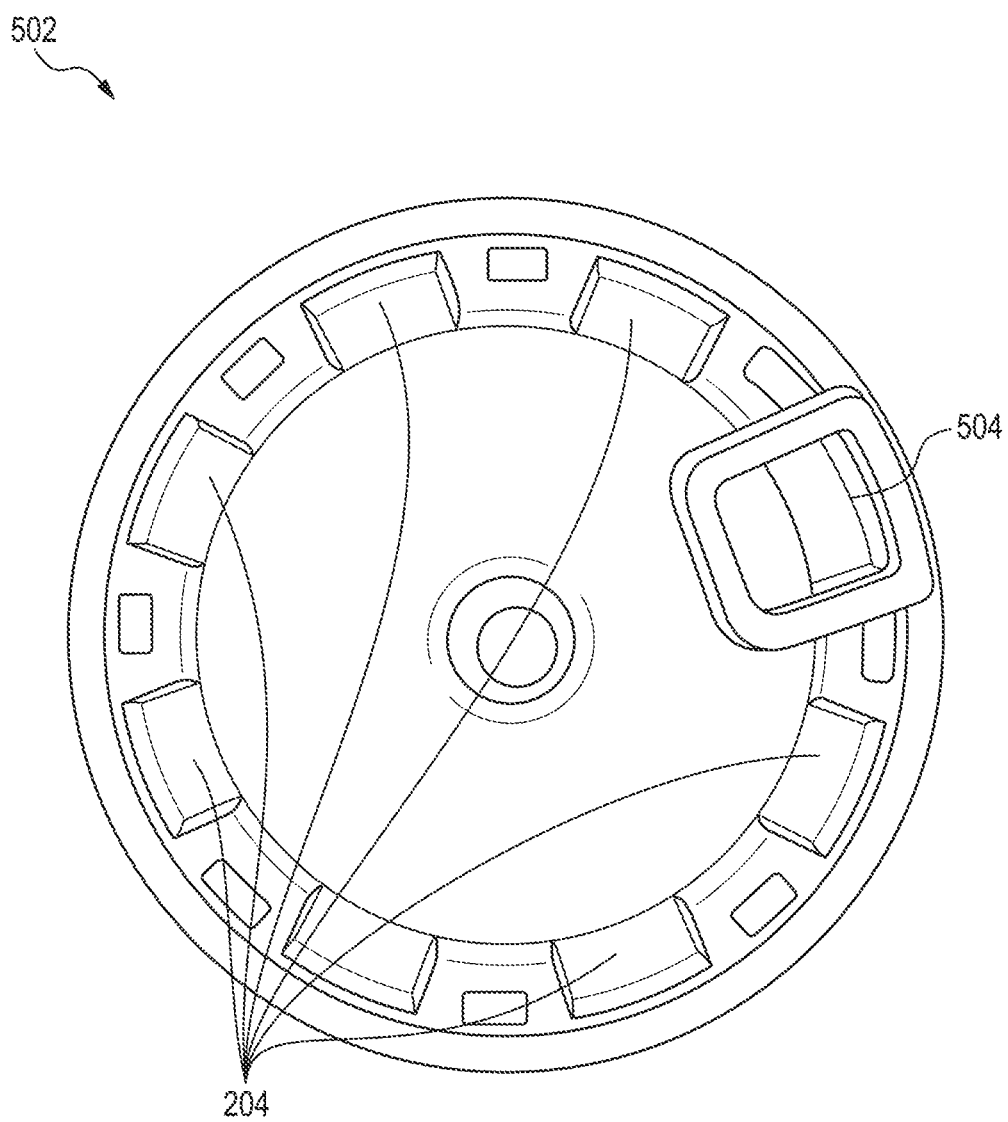
FIG. 5C shows a top view of the water retention barrier with the vertical vent tube of the fuel water separator of FIG. 5A.

FIG. 5C shows a top view of the water retention barrier 502 with the vertical vent tube 504 of the FWS 500 of FIG. 5A. As shown in FIG. 5C, the water retention barrier 502 includes seven drain openings 204 and one vertical vent tube 504.

Referring to FIG. 6, a pair of perspective views of a water retention barrier 600 are shown, according to another example embodiment. In some embodiments, the water retention barrier 600 includes a crescent shaped drain opening 604 that is approximately 9.525 mm in diameter, i.e, the maximum opening size of the crescent is approximately 9.525 mm. The water retention barrier 600 self-vents and does not require a vent tube in the FWS system. In one embodiment, the water retention barrier 600 is structured to drain 130 ml/minute of water at 32 mN/m.

Referring to FIG. 7, a pair of perspective view of a water retention barrier 700 are shown, according to an example embodiment. In some embodiments, the water retention barrier 700 includes two crescent shaped drain openings 704 disposed opposite of each other (relative a center of the retention barrier 700) such that the water retention barrier 700 is axisymmetric. The drain openings 704 are each approximately 9.525 mm in diameter. The water retention barrier 700 self-vents and does not require a vent tube in the FWS system. In one embodiment, the water retention barrier 700 is structured to drain 300 ml/minute of the water at 32 mN/m.

Figure 8:
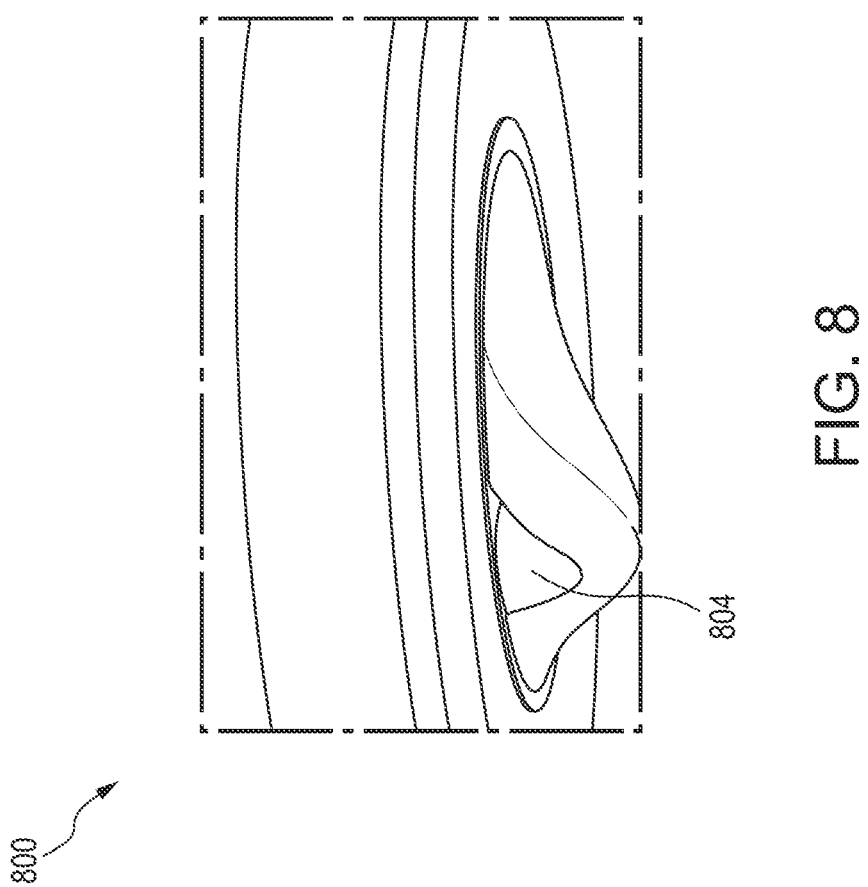
FIG. 8 shows a perspective view of a water retention barrier, according to yet another example embodiment.

Referring to FIG. 8, a perspective view of a water retention barrier 800 is shown, according to another example embodiment. In some embodiments, the water retention barrier 800 includes a crescent shaped drain opening 804 that is approximately 6.35 mm in diameter. The water retention barrier 800 self-vents and does not require a vent tube in the FWS system. In one embodiment, the water retention barrier 800 is structured to drain 63 ml/minute of water at 32 mN/m.

Referring to FIG. 9, a pair perspective view of a water retention barrier 900 are shown, according to another example embodiment. In some embodiments, the water retention barrier 900 includes a vent pipe 902 and a rounded shaped drain opening 904 that are disposed opposite of each other (relative a center of the water retention barrier 900). In some embodiments, the rounded shaped drain opening 904 is approximately 6.35 mm in diameter. In one embodiment, the water retention barrier 900 is structured to drain 60 ml/minute of water at 32 mN/m. As will be appreciated, the water retention barrier 900 may be used as the water retention barrier for the FWS 500 of FIGS. 5A-5C.

Figure 10:
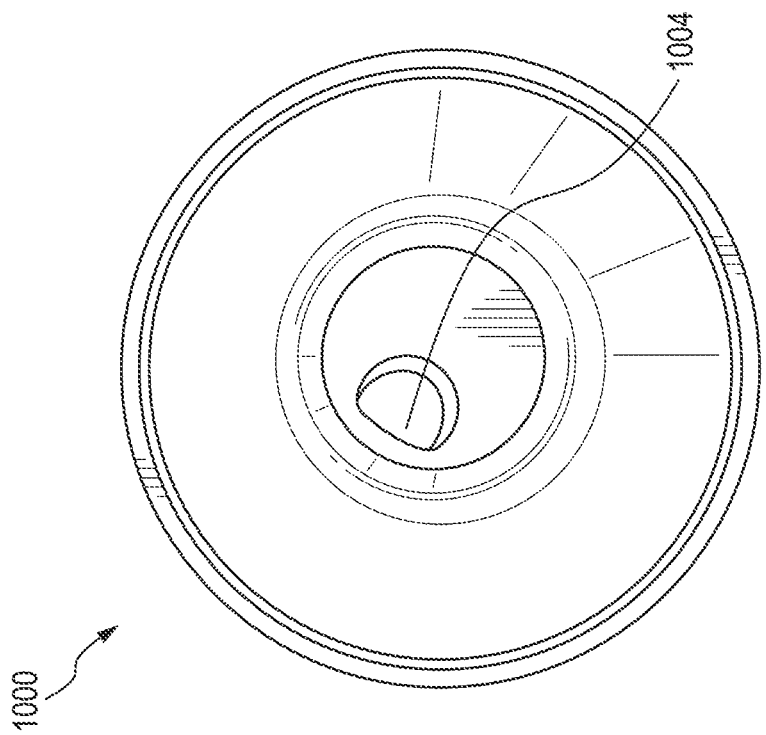
FIG. 10 shows a perspective view of a water retention barrier, according to a further example embodiment.

Referring to FIG. 10, a perspective view of a water retention barrier 1000 is shown, according to another example embodiment. In some embodiments, the water retention barrier 1000 includes a rounded shaped drain opening 1004 at the central region of the water retention barrier 1000 that is approximately 5.6 mm in diameter. The water retention barrier 1000 self-vents and does not require a vent tube in the FWS system. In some embodiments, the drain opening 1004 is stamped into the water retention barrier 1000. In one embodiment, the water retention barrier 1000 is structured to drain 50 ml/minute of water at 32 mN/m.

Figure 11:
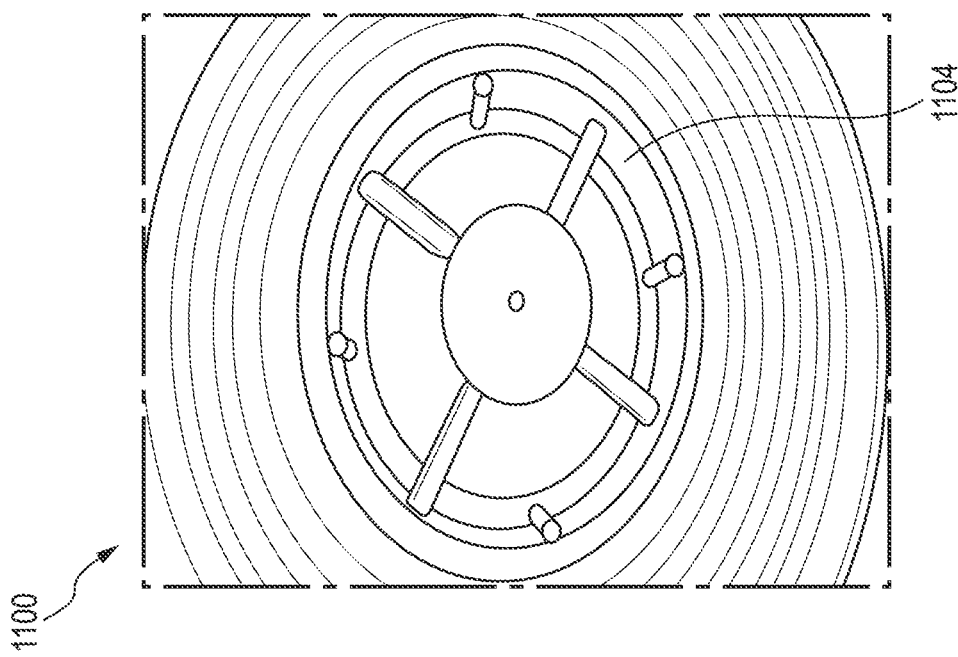
FIG. 11 shows a perspective view of a water retention barrier, according to yet another example embodiment.

Referring to FIG. 11, a perspective view of a water retention barrier 1100 is shown, according to another example embodiment. In some embodiments, the water retention barrier 1100 includes a drain opening 1104 disposed around the circumference. In one embodiment, the drain opening 1104 is less than 1 mm.

Figure 12:
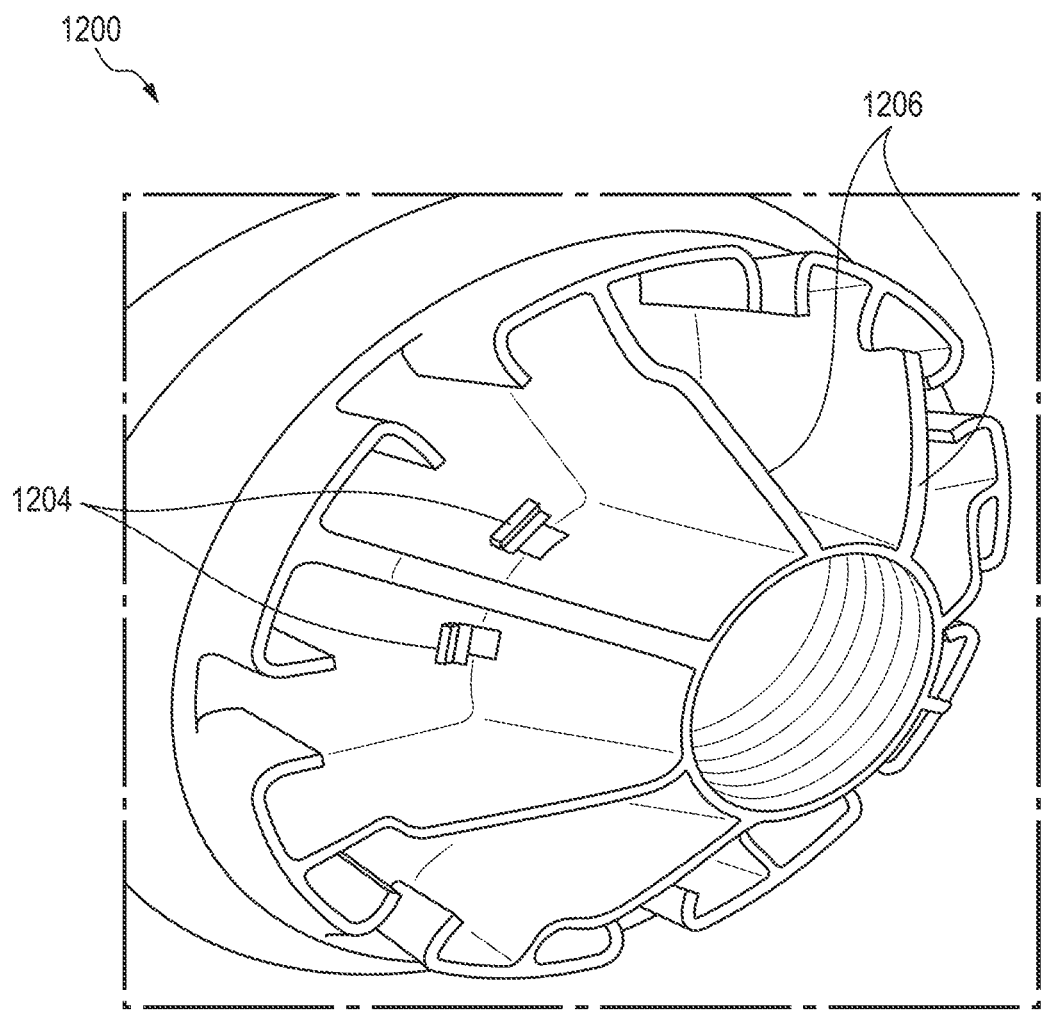
FIG. 12 shows a bottom perspective view of a water retention barrier, according to a further example embodiment.

Referring to FIG. 12 a bottom perspective view of a water retention barrier 1200 is shown, according to an example embodiment. The water retention barrier 1200 is molded onto an endplate. As shown in FIG. 12, the water retention barrier 1200 includes a plurality of drain openings 1204 and a plurality of ribs 1206. The plurality of ribs 1206 are disposed on the bottom surface (e.g., water collection sump 122 side) of the endplate. The plurality of ribs 1206 provide support attachment for the water collection sump 122. In some embodiments, the height of the plurality of ribs 1206 may be increased to reduce coalesced water motion in the water collection sump 122 and make coalesced water re-entrainment more difficult. As will be appreciated, the water retention barrier 400 may be used as the water retention barrier for the FWS 200 of FIGS. 2A & 2B.

The above-described filter media, filter elements, and coalescer elements are described in relation to FWS. However, the same principles can be applied to other filtration systems that utilize coalescence to remove dispersed phase from a continuous phase (e.g., oil water separators or crankcase ventilation coalescer). Further, while multiple embodiments describe various dimensions of the drain opening, it is anticipated that the drain opening may have a cross-section of a wide variety of target shapes and sizes.

References herein to the positions of elements (e.g., "top," "bottom," "above," "below," etc.) are merely used to describe the orientation of various elements in the Figures. It should be noted that the orientation of various elements may differ according to other example embodiments, and that such variations are intended to be encompassed by the present disclosure.

As utilized herein, the term "substantially" and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed (e.g., within plus or minus five percent of a given angle or other value) are considered to be within the scope of the invention as recited in the appended claims. The term "approximately" when used with respect to values means plus or minus five percent of the associated value.

The terms "coupled" and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various example embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Additionally, features from particular embodiments may be combined with features from other embodiments as would be understood by one of ordinary skill in the art. Other substitutions, modifications, changes and omissions may also be made in the design, operating conditions and arrangement of the various example embodiments without departing from the scope of the present invention.

What is claimed is:

1. A fuel water separator comprising:
   a housing defining an internal volume, the internal volume receiving a mixture; and
   a filter element positioned within the internal volume, the filter element comprising:
   a first endplate;
   a second endplate located opposite the first endplate; and
   a filter media coupled to the first endplate and the second endplate, the filter media structured to separate a dispersed phase from a continuous phase of the mixture;
   a collection sump located below the first and second endplate, the collection sump structured to receive the dispersed phase; and
   a retention barrier disposed above the collection sump, the retention barrier comprising at least one drain opening, the at least one drain opening comprising a first crescent-shaped drain opening.

2. The fuel water separator of claim 1, wherein the at least one drain opening further comprises a second crescent-shaped drain opening positioned substantially opposite the first crescent-shaped drain opening relative to a center of the retention barrier.

3. The fuel water separator of claim 1, wherein the first endplate comprises a flow passage; and
   wherein the retention barrier is coupled to the first endplate within the flow passage.

4. The fuel water separator of claim 1, wherein the first crescent-shaped drain opening has a diameter of between 5.6 millimeters and 9.53 millimeters.

5. A fuel water separator comprising:
   a housing defining an internal volume, the internal volume receiving a mixture; and
   a filter element positioned within the internal volume, the filter element comprising:
   a first endplate;
   a second endplate located opposite the first endplate; and
   a filter media coupled to the first endplate and the second endplate, the filter media structured to separate a dispersed phase from a continuous phase of the mixture;
   a collection sump located below the first and second endplate, the collection sump structured to receive the dispersed phase; and
   a retention barrier disposed above the collection sump, the retention barrier comprising:
   a retention bowl having an angled surface, and
   a porous, hydrophilic material on the angled surface, the porous, hydrophilic material promoting collection and drainage of the dispersed phase.

6. The fuel water separator of claim 5, wherein the porous, hydrophilic material is disposed on a bottom surface of the water retention barrier such that the porous, hydrophilic material contacts the collection sump.

7. The fuel water separator of claim 5, wherein the retention barrier further comprises a plurality of hydrophilic fibers disposed across an inner diameter of the first endplate.

8. A fuel water separator comprising:
   a housing defining an internal volume, the internal volume receiving a mixture; and
   a filter element positioned within the internal volume, the filter element comprising:
   a first endplate;
   a second endplate located opposite the first endplate; and
   a filter media coupled to the first endplate and the second endplate, the filter media structured to separate a dispersed phase from a continuous phase of the mixture;
   a collection sump located below the first and second endplate, the collection sump structured to receive the dispersed phase; and
   a retention barrier disposed above the collection sump, the retention barrier comprising:
   a retention bowl; and
   a drain opening, the drain opening positioned at a central region of the retention bowl and facing a radial direction, such that the drain opening drains the dispersed phase in the radial direction.

9. The fuel water separator of claim 8, wherein the retention bowl further comprises an angled surface slanted downward towards the central region of the retention bowl, the angled surface facilitating movement of the dispersed phase toward the central region and through the drain opening.

* * * * *